United States Patent
Shih (10) Patent No.: US 10,821,734 B2
(45) Date of Patent: Nov. 3, 2020

(54) COLORING NOZZLE CLEANING ASSEMBLY

(71) Applicants: XYZPRINTING, INC., New Taipei (TW); KINPO ELECTRONICS, INC., New Taipei (TW)

(72) Inventor: Hsueh-Kuan Shih, New Taipei (TW)

(73) Assignees: XYZPRINTING, INC., New Taipei (TW); KINPO ELECTRONICS, INC., New Taipei (TW)

(*) Notice: Subject to any disclaimer, the term of this patent is extended or adjusted under 35 U.S.C. 154(b) by 299 days.

(21) Appl. No.: 15/630,897

(22) Filed: Jun. 22, 2017

(65) Prior Publication Data

US 2018/0339465 A1 Nov. 29, 2018

(30) Foreign Application Priority Data

May 23, 2017 (CN) ............ 2017 1 0368146

(51) Int. Cl.
*B41J 2/165* (2006.01)
*B29C 64/35* (2017.01)
(Continued)

(52) U.S. Cl.
CPC .......... *B41J 2/16544* (2013.01); *B29C 64/35* (2017.08); *B33Y 40/00* (2014.12); *B41J 2/16538* (2013.01);
(Continued)

(58) Field of Classification Search
None
See application file for complete search history.

(56) References Cited

U.S. PATENT DOCUMENTS

| 7,717,539 B2 * | 5/2010 | Seo ............. B41J 2/16552 347/28 |
| 7,824,004 B2 * | 11/2010 | Tokuno ............. B41J 2/16538 347/22 |

(Continued)

FOREIGN PATENT DOCUMENTS

| JP | 2007163751 A | 6/2007 |
| JP | 2017043052 A | 3/2017 |

OTHER PUBLICATIONS

Search Report dated Feb. 2, 2018 of the corresponding European patent application No. 17178200.6.

(Continued)

*Primary Examiner* — Rita P Adhlakha
(74) *Attorney, Agent, or Firm* — Chun-Ming Shih; HDLS IPR Services (57) ABSTRACT

A coloring nozzle cleaning assembly is used to clean a coloring nozzle of a 3D printing device. The coloring nozzle cleaning assembly includes a cleaning tank, a movable scraper and a liquid-absorbent interference member. The cleaning tank includes an opening and receives a cleaning liquid inside. The movable scraper has a contact end placed inside the cleaning tank and immersed in the cleaning liquid, and the contact end can be moved out of the cleaning tank through the opening to scrape against the coloring nozzle. The liquid-absorbent interference member is disposed within an area of the opening, and is located over a liquid level of the cleaning liquid and interferes with a movement course of the movable scraper. Excess cleaning liquid adhered to the movable scraper is absorbed by the liquid-absorbent interference member before the movable scraper cleans the coloring nozzle.

7 Claims, 6 Drawing Sheets

(51) Int. Cl.
*B33Y 40/00* (2020.01)
*B29C 64/112* (2017.01)
*B33Y 70/00* (2020.01)

(52) U.S. Cl.
CPC ......... *B41J 2/16541* (2013.01); *B29C 64/112* (2017.08); *B33Y 70/00* (2014.12); *B41J 2002/16558* (2013.01)

(56) References Cited

U.S. PATENT DOCUMENTS

| | | |
|---|---|---|
| 2001/0020963 A1 | 9/2001 | Fukushima et al. |
| 2007/0229579 A1 | 10/2007 | Seo |
| 2008/0278538 A1 | 11/2008 | Tokuno |
| 2016/0031221 A1 | 2/2016 | Fernando et al. |

OTHER PUBLICATIONS

Office Action dated Feb. 14, 2020 of the corresponding Japan patent application.

\* cited by examiner

COLORING NOZZLE CLEANING ASSEMBLY

BACKGROUND OF THE INVENTION

Technical Field

The present disclosure relates to a cleaning assembly for a three-dimensional (3D) printing device and, in particular, to a coloring nozzle cleaning assembly capable of avoiding excessive use of a cleaning liquid.

Description of Related Art

In current markets, a cleaning assembly for a two-dimensional (2D) printer nozzle or a three-dimensional (3D) coloring nozzle usually includes a scraper. When it is desired to clean a nozzle, the nozzle moves to contact the scraper and then moves back and forth to allow the scraper to scrape off ink adhered to the nozzle for cleaning it. Generally, the 2D printer nozzles can be cleaned effectively by this way.

The 3D coloring nozzle typically collaborates with a formation nozzle. Plastic powders caused during operation of the formation nozzle are easily adhered to ink on the coloring nozzle to form dirt (impurities). Once the dirt is dried and cured, it won't be easy to scrape off the dirt. Therefore, the dirt has to be removed by the cleaning assembly for the 3D coloring nozzle, which uses a cleaning liquid on its scraper for dissolving the dirt. However, the scraper often has excess cleaning liquid, which results in reduction of friction between the scraper and the dirt and thereby causes poor cleaning effect. At the same time, the coloring nozzle has too much cleaning liquid adhered thereto, so the powders easily adhere to the excess cleaning liquid on the coloring nozzle to form dirt.

In views of this, in order to solve the above disadvantages, the present inventor studied related technology and provided a reasonable and effective solution in the present disclosure.

SUMMARY OF THE INVENTION

The present disclosure provides a coloring nozzle cleaning assembly for preventing excessive use of a cleaning liquid.

The present disclosure provides a coloring nozzle cleaning assembly for cleaning a coloring nozzle of a three-dimensional (3D) printing device. The coloring nozzle cleaning assembly includes a cleaning tank, a movable scraper and a liquid-absorbent interference member. The cleaning tank includes an opening and receiving a cleaning liquid inside. The movable scraper includes a contact end. The contact end is disposed inside the cleaning tank and is immersed in the cleaning liquid. The contact end is movable out of the cleaning tank through the opening to scrape against the coloring nozzle. The liquid-absorbent interference member is disposed within an area of the opening. The liquid-absorbent interference member is disposed over a liquid level of the cleaning liquid and interferes with a movement course of the movable scraper.

In the coloring nozzle cleaning assembly of the present disclosure, the movable scraper includes a pivot, and the movable scraper pivots about the pivot to move the contact end. The movable scraper is connected to an actuator, and the actuator drives pivotal movement of the movable scraper.

In the coloring nozzle cleaning assembly, the liquid-absorbent interference member is fixed, one side of the liquid-absorbent interference member toward the cleaning liquid consists of a porous material. The other side of the liquid-absorbent interference member away from the cleaning liquid consists of a non-liquid-absorbent hard material.

In the coloring nozzle cleaning assembly of the present disclosure, the liquid-absorbent interference member is movable out of the movement course of the movable scraper. The liquid-absorbent interference member consists of a porous material.

In the coloring nozzle cleaning assembly of the present disclosure, an immersed interference member is disposed inside the cleaning tank, and the immersed interference member is immersed in the cleaning liquid and interferes with the movement course of the movable scraper. The immersed interference member consists of a porous material or consists of a non-liquid-absorbent hard material.

In the coloring nozzle cleaning assembly of the present disclosure, the liquid-absorbent interference member scrapes off excess cleaning liquid adhered to the movable scraper before the movable scraper cleans the coloring nozzle, thus preventing excess cleaning liquid from adhering to the coloring nozzle when the movable scraper scrapes against the coloring nozzle and thereby preventing powders from adhering to the cleaning liquid on the coloring nozzle to form dirt.

BRIEF DESCRIPTION OF THE DRAWINGS

The disclosure will become more fully understood from the detailed description, and the drawings given herein below is for illustration only, and thus does not limit the disclosure, wherein.

DETAILED DESCRIPTION OF THE INVENTION

Figure 1:
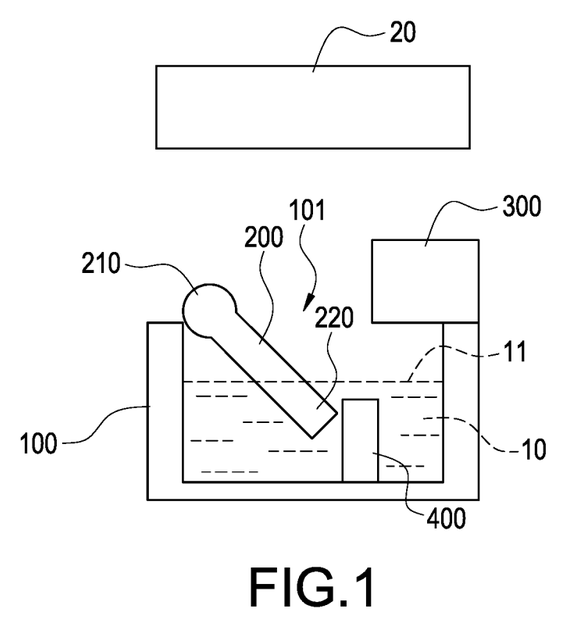
FIG. 1 is a schematic view illustrating a coloring nozzle cleaning assembly according to the first embodiment of the present disclosure.
Figure 2:
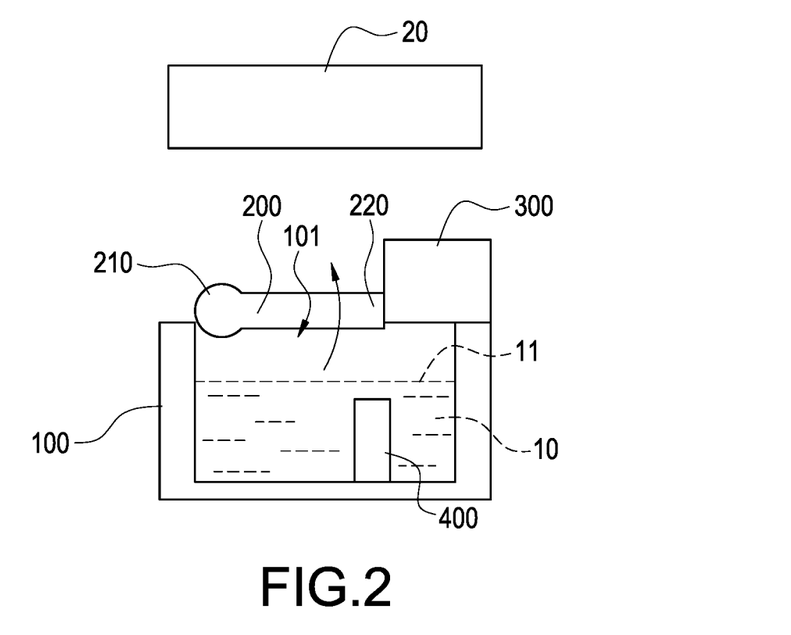
FIGS. 2 to 5 are in-use views illustrating the coloring nozzle cleaning assembly according to the first embodiment of the present disclosure.
Figure 3:
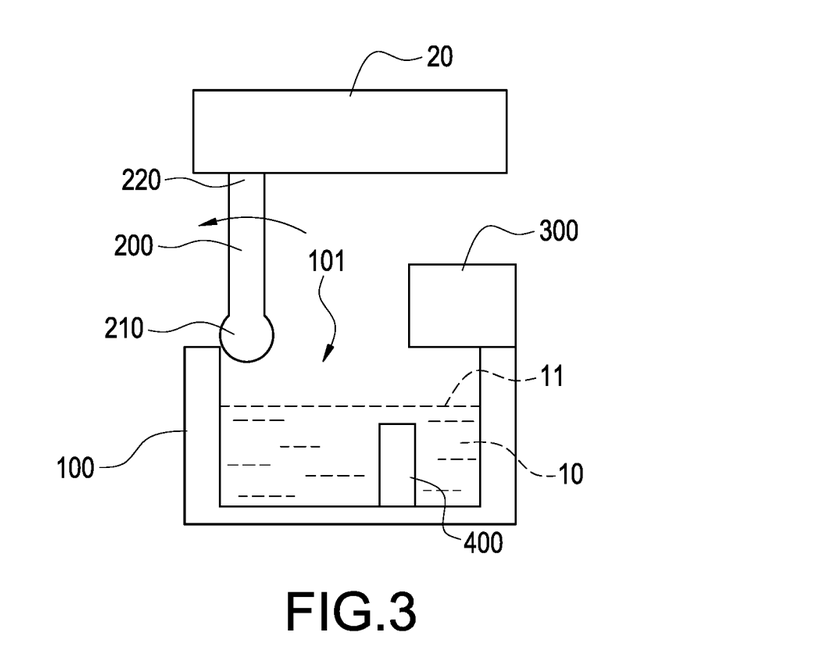
Figure 4:
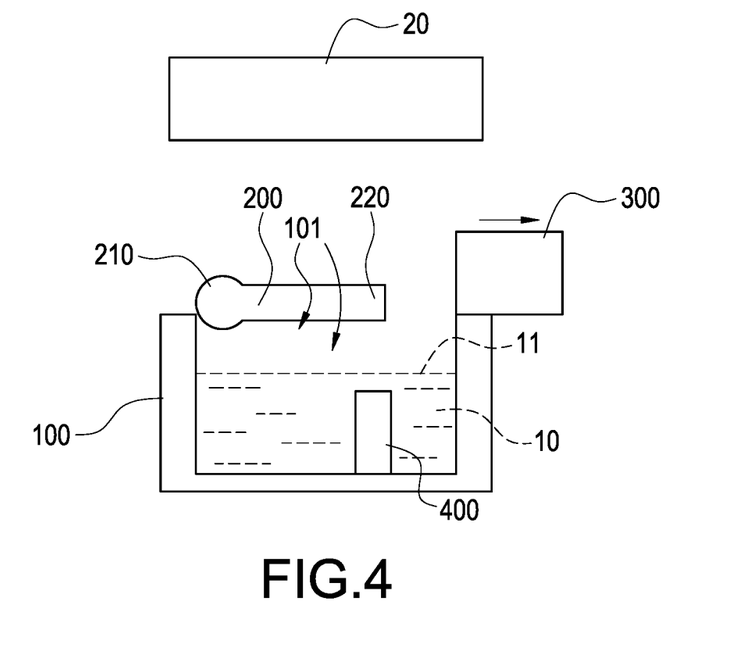
Figure 5:
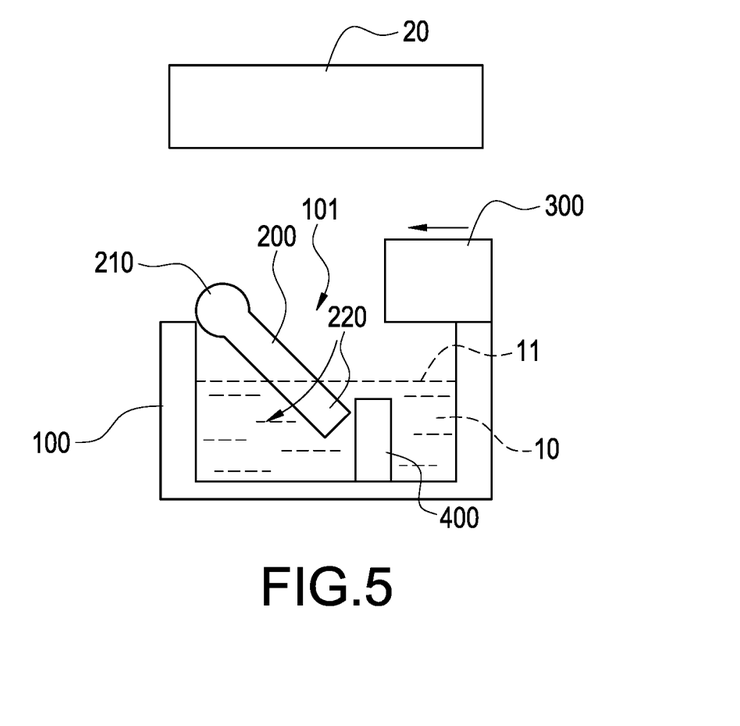

Please refer to FIG. 1 illustrating a coloring nozzle cleaning assembly according to the first embodiment of the present disclosure. The coloring nozzle cleaning assembly includes a cleaning tank 100, a movable scraper 200 and a liquid-absorbent interference member 300.

The cleaning tank 100 is an open tank. An opening 101 is preferably defined on a top portion of the cleaning tank 100. The cleaning tank 100 is used to receive a cleaning liquid 10 inside for cleaning the movable scraper 200. The cleaning liquid 10 can be, for example, water, alcohol or other liquid, and the present disclosure is not limited to any particular type of the cleaning liquid 10.

The movable scraper 200 is disposed corresponding to the cleaning tank 100 and its opening 101. In the present embodiment, the movable scraper 200 is of elongated shape and is pivotally movable. One end of the movable scraper 200 has a pivot 210, and the other end of the movable scraper 200 is a contact end 220. The pivot 210 is pivotally disposed at one side of the opening 101 of the cleaning tank 100. The movable scraper 200 pivots about the pivot 210 to move the contact end 220. The pivot 210 can be disposed inside or outside the cleaning tank 100, and the present disclosure is not limited in this regard. The contact end 220 extends to the inside of the cleaning tank 100 to be immersed in the cleaning liquid 10. The movable scraper 200 is pivotally movable to move the contact end 220 out of the cleaning tank 100 through the opening 101 to scrape against the coloring nozzle 20. The movable scraper 200 is preferably connected to an actuator (not illustrated), and the actuator drives pivotal movement of the movable scraper 200. In the present embodiment, the actuator can be disposed at the pivot 210 to drive rotation of the pivot 210 to thereby drive pivotal movement of the movable scraper 200. Alternatively, the movable scraper 200 can be moved by other mechanism in different ways (e.g. by vertically ascending/descending movement) to move the contact end 220 in or out of the cleaning tank 100; the present disclosure is not limited in this regard.

The liquid-absorbent interference member 300 is disposed within an area of the opening 101 of the cleaning tank 100. In the present embodiment, the liquid-absorbent interference member 300 preferably consists of a porous material. The liquid-absorbent interference member 300 is disposed over a liquid level 11 of the cleaning liquid 10 and interferes with a movement course of the contact end 220 of the movable scraper 200. In the present embodiment, the liquid-absorbent interference member 300 is disposed on the opening 11 of the cleaning tank 100 and is disposed at another side of the movable scraper 200 opposite to the pivot 210. The liquid-absorbent interference member 300 is horizontally movable to be removed out of the movement course of the movable scraper 200. In the present embodiment, the liquid-absorbent interference member 300 is driven by another actuator (not illustrated) to move horizontally; however, the present disclosure is not limited in this regard.

An immersed interference member 400 is disposed inside the cleaning tank 100. The immersed interference member 400 is immersed in the cleaning liquid 10 and interferes with the movement course of the contact end 220 of the movable scraper 200. The immersed interference member 400 can consist of a non-liquid-absorbent hard material or can consist of a porous material.

Referring to FIG. 2 to FIG. 5, when cleaning the coloring nozzle 20, the movable scraper 200 rotates to move the contact end 220 out of the opening 101 of the cleaning tank 100. This movement interferes with the liquid-absorbent interference member 300, so the liquid-absorbent interference member 300 absorbs the cleaning liquid 10 adhering to the contact end 220. Accordingly, when the contact end 220 is scraping against the coloring nozzle 20, an excess portion of the cleaning liquid 10 on the contact end 220 is prevented from adhering to the coloring nozzle 20, thereby preventing powders from adhering to the cleaning liquid 10 on the coloring nozzle 20 to form dirt (impurities). The coloring nozzle 20 contacts the contact end 220 and moves horizontally to scrape off the dirt adhering to the coloring nozzle 20. After cleaning, the movable scraper 200 rotates to move the contact end 220 thereof into the cleaning tank 100. During this movement, the liquid-absorbent interference member 300 is removed out of the movement course of the contact end 220, and thereby the liquid-absorbent interference member 30 is prevented from adhering/absorbing the dirt sticking to the contact end 220. The contact end 220 of the movable scraper 200 is immersed into the cleaning liquid 10. The cleaning liquid 10 dissolves the dirt adhering onto the contact end 220, the contact end 220 moves further to contact the immersed interference member 400, and the immersed interference member 400 scrapes against the contact end 220 to remove the dirt adhering onto the contact end 220, thereby cleaning the movable scraper 200 for cleaning the coloring nozzle 20 next time.

Figure 6:
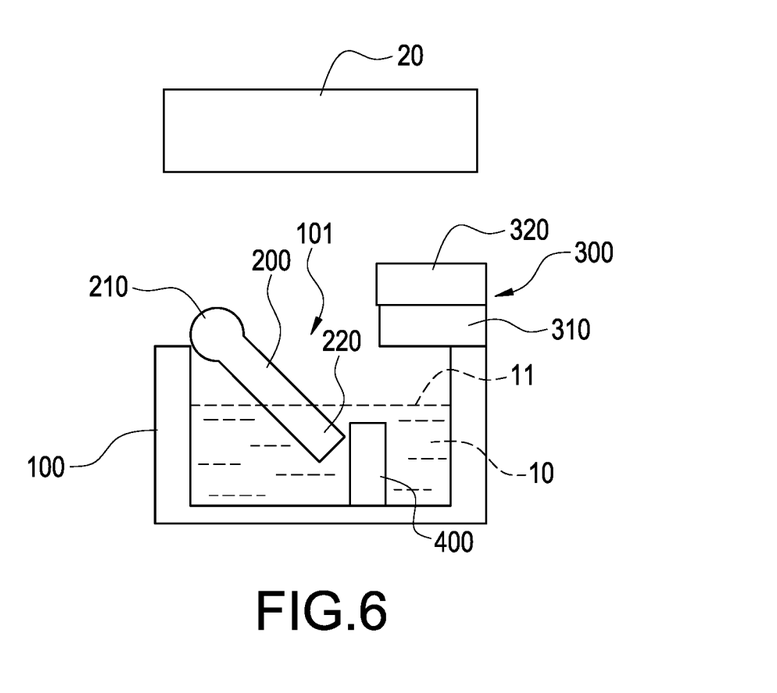
FIG. 6 is a schematic view illustrating a coloring nozzle cleaning assembly according to the second embodiment of the present disclosure.
Figure 7:
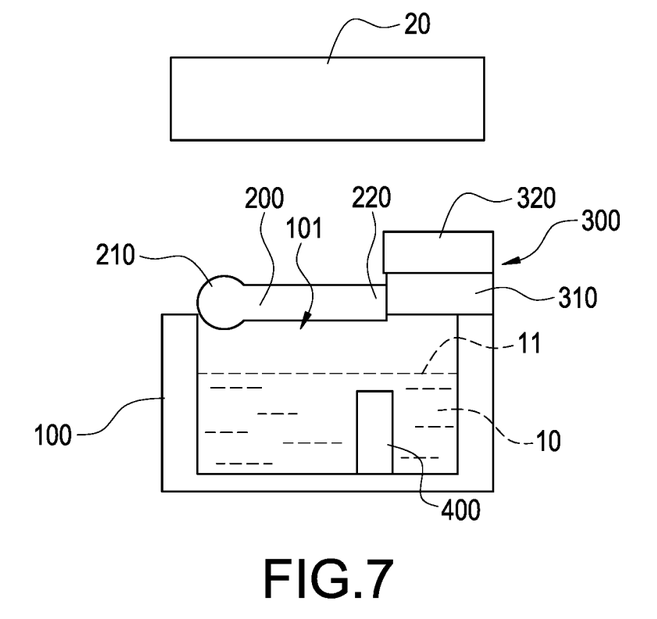
FIGS. 7 to 10 are in-use views illustrating the coloring nozzle cleaning assembly according to the second embodiment of the present disclosure.
Figure 8:
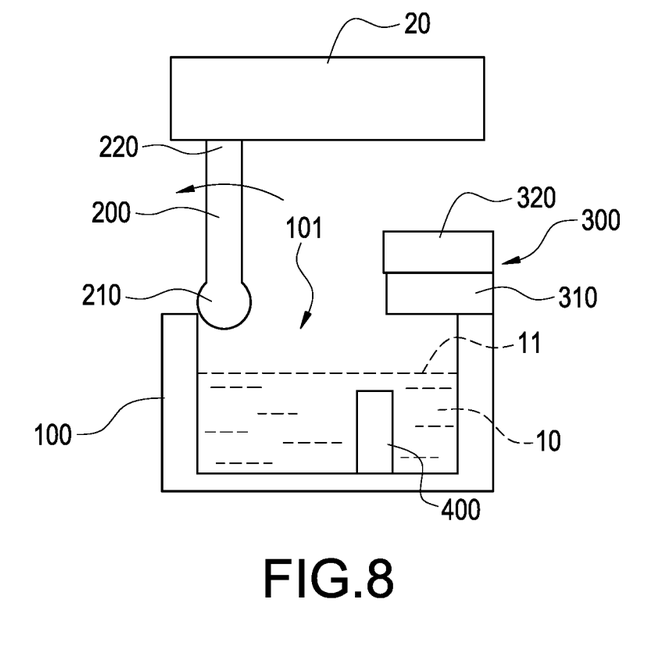
Figure 9:
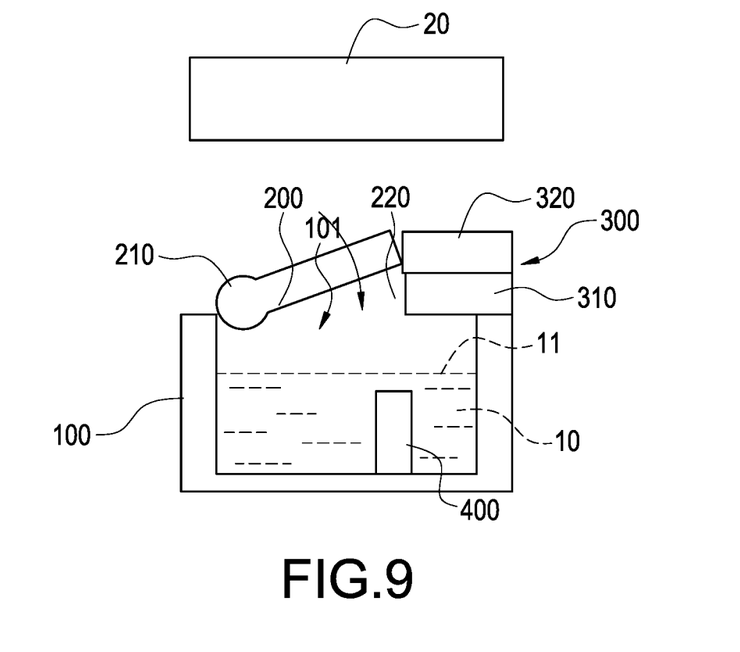
Figure 10:
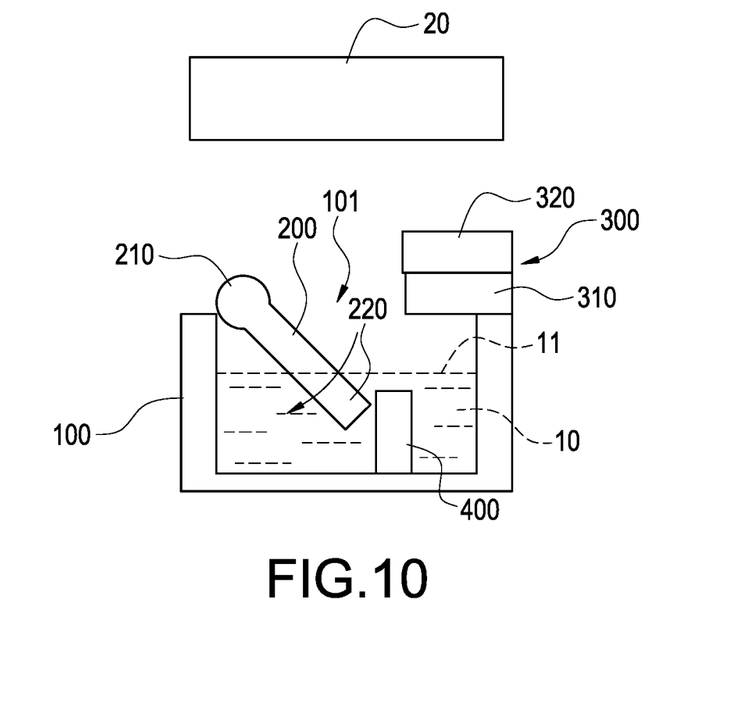

Please refer to FIG. 6, showing a coloring nozzle cleaning assembly according to the second embodiment of the present disclosure. The coloring nozzle cleaning assembly includes a cleaning tank 100, a movable scraper 200 and a liquid-absorbent interference member 300. The cleaning tank 100 and the movable scraper 200 are the same as those in the first embodiment, so a detailed description thereof is not repeated for brevity. The present embodiment is different from the first embodiment in that, in the present embodiment, the liquid-absorbent interference member 300 is fixed, a bottom side 310 of the liquid-absorbent interference member 300 toward the cleaning liquid 10 consists of a porous material, and a top side 320 of the liquid-absorbent interference member 300 away from the cleaning liquid 10 consists of a non-liquid-absorbent hard material.

Referring to FIGS. 7 to 10, when the movable scraper 200 rotates to move the contact end 220 out of the cleaning tank 100, the porous material of the bottom side 310 of the liquid-absorbent interference member 300 contacts the contact end 220 of the movable scraper 200 and absorbs and removes the excessive portion of the cleaning liquid 10 on the contact end 220. After the coloring nozzle 20 is cleaned, the movable scraper 200 rotates to move the contact end 220 into the cleaning tank 100. During this movement, the non-liquid-absorbent hard material of the top side 320 of the liquid-absorbent interference member 300 contacts the contact end 220 of the movable scraper 200 and takes a first step to scrape and remove the dirt adhering onto the contact end 220. The top side 320 of the liquid-absorbent interference member 300 consists of the non-liquid-absorbent hard material, thus avoiding absorbing dirt.

It is to be understood that the above descriptions are merely the preferable embodiments of the present disclosure and are not intended to limit the scope of the present disclosure. Equivalent changes and modifications made in the spirit of the present disclosure are regarded as falling within the scope of the present disclosure.

What is claimed is:
1. A coloring nozzle cleaning assembly, for cleaning a coloring nozzle of a three-dimensional printing device, the coloring nozzle cleaning assembly comprising:
   a cleaning tank including an opening and receiving a cleaning liquid inside;
   a movable scraper including a contact end, the contact end being disposed inside the cleaning tank and being immersed in the cleaning liquid, the contact end being movable out of the cleaning tank through the opening to scrape against the coloring nozzle; and
   a liquid-absorbent interference member disposed within an area of the opening, the liquid-absorbent interference member being disposed over a liquid level of the cleaning liquid and interfering with a movement course of the movable scraper,
   wherein the movable scraper includes a pivot, and the movable scraper pivots at one side of the opening of the cleaning tank to move the contact end to reciprocate in and out of the cleaning tank;
   wherein the liquid-absorbent interference member is fixed, and one side of the liquid-absorbent interference member toward the cleaning liquid consists of a porous material;

wherein an other side of the liquid-absorbent interference member away from the cleaning liquid consists of a non-liquid-absorbent hard material;

wherein when the movable scraper rotates to move the contact end out of the cleaning tank, the porous material of the bottom side of the liquid-absorbent interference member contacts the contact end of the movable scraper and absorbs and removes the excessive portion of the cleaning liquid on the contact end; and wherein when the movable scraper rotates to move the contact end into the cleaning tank, the non-liquid-absorbent hard material of the top side of the liquid-absorbent interference member contacts the contact end of the movable scraper and takes a first step to scrape and remove the dirt adhering onto the contact end.

2. The coloring nozzle cleaning assembly according to claim 1, wherein the movable scraper is connected to an actuator, and the actuator drives pivotal movement of the movable scraper.

3. The coloring nozzle cleaning assembly according to claim 1, wherein the liquid-absorbent interference member is movable to be removed from the movement course of the movable scraper.

4. The coloring nozzle cleaning assembly according to claim 3, wherein the liquid-absorbent interference member consists of a porous material.

5. The coloring nozzle cleaning assembly according to claim 1, wherein an immersed interference member is disposed inside the cleaning tank, and the immersed interference member is immersed in the cleaning liquid and interferes with the movement course of the movable scraper.

6. The coloring nozzle cleaning assembly according to claim 5, wherein the immersed interference member consists of a porous material.

7. The coloring nozzle cleaning assembly according to claim 5, wherein the immersed interference member consists of a non-liquid-absorbent hard material.

* * * * *